Nov. 19, 1963 R. LAPSLEY 3,111,040
SHIFTER MECHANISM
Filed Aug. 17, 1960 4 Sheets-Sheet 4
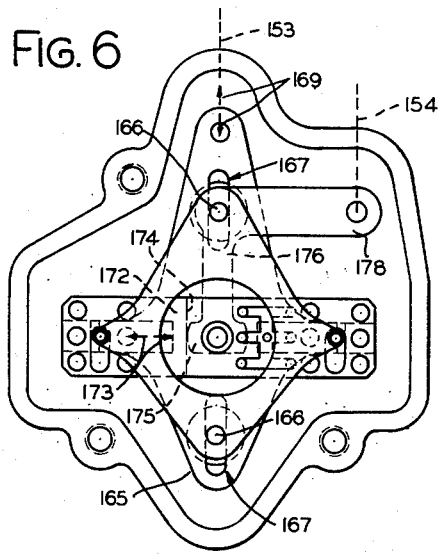
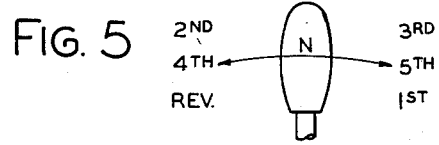
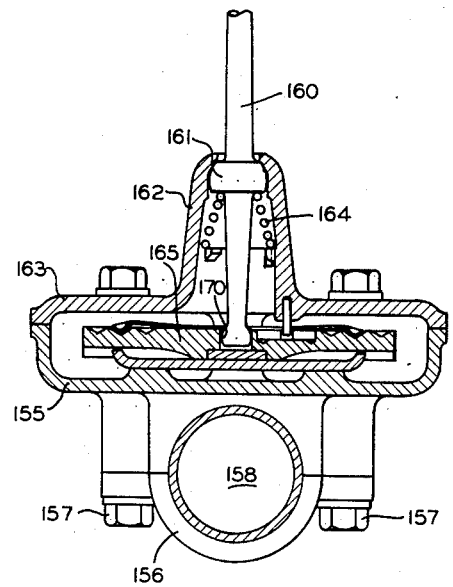
INVENTOR.
ROBERT LAPSLEY
ATTORNEYS.

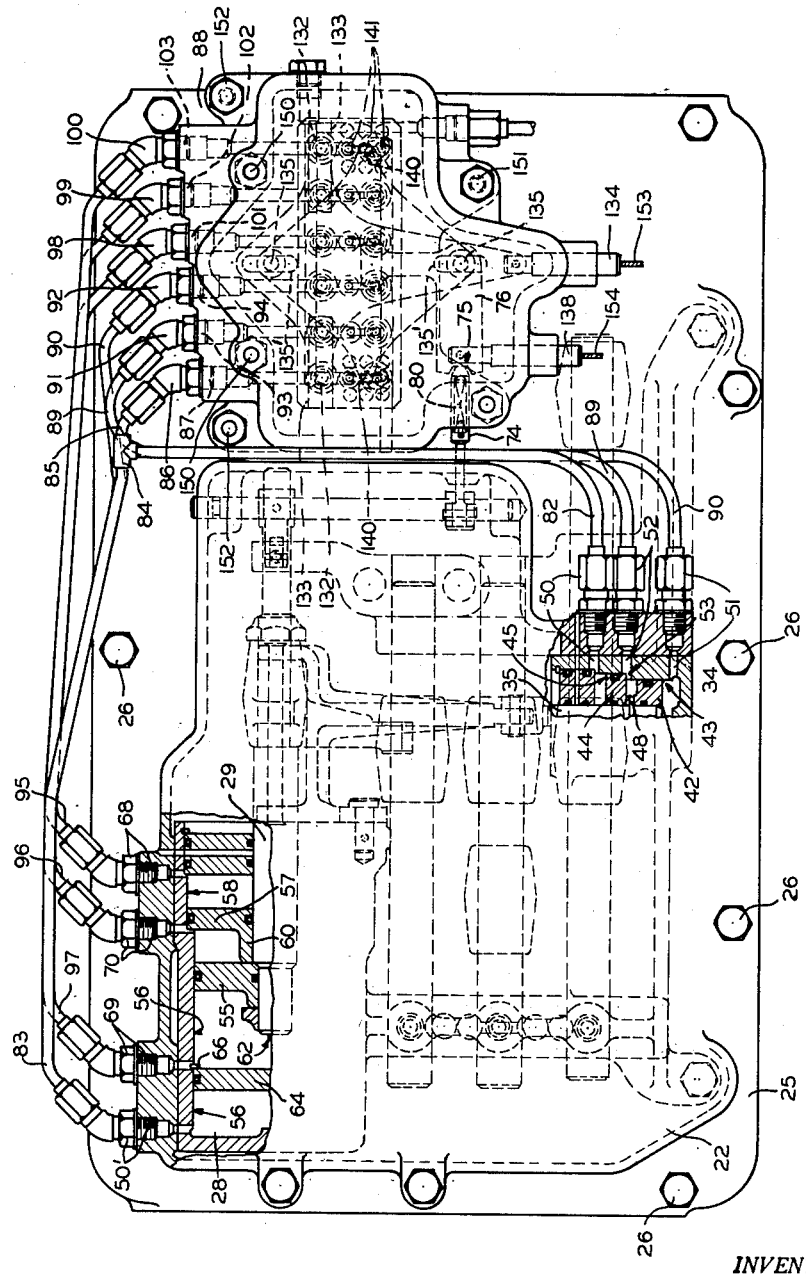

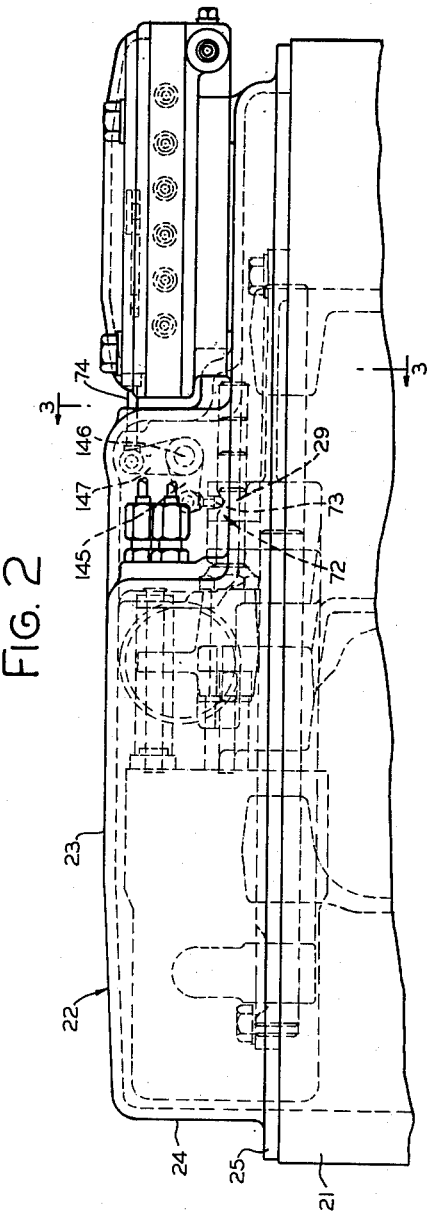
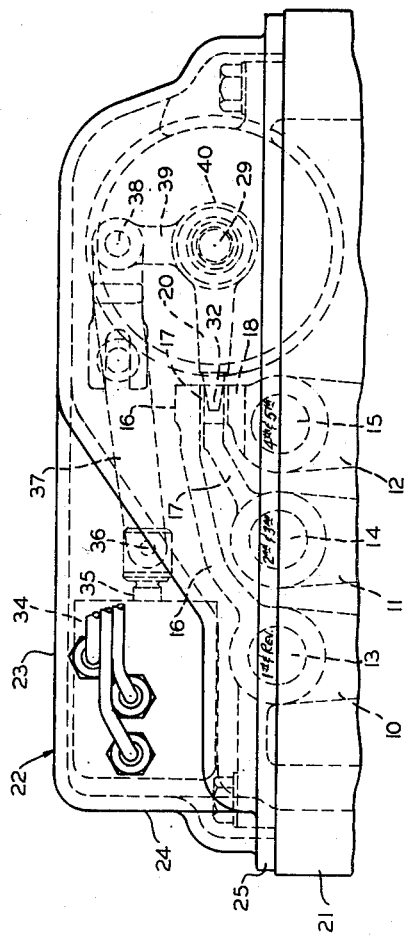

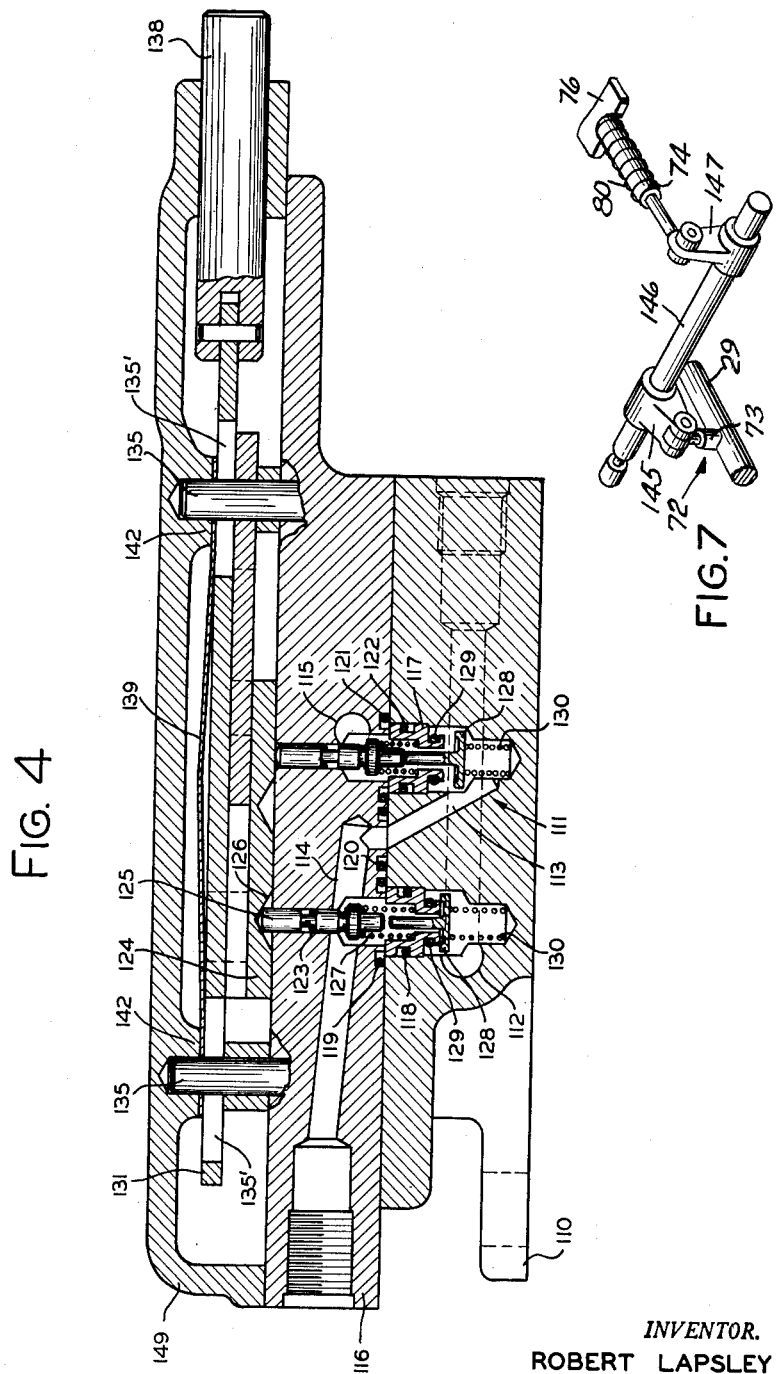

United States Patent Office 3,111,040
Patented Nov. 19, 1963

3,111,040
SHIFTER MECHANISM
Robert Lapsley, Buchanan, Mich., assignor to Clark Equipment Company, a corporation of Michigan
Filed Aug. 17, 1960, Ser. No. 50,145
20 Claims. (Cl. 74—346)

This invention relates, in general, to a shifter mechanism, and has particular relation to a fluid powered shifter mechanism for shifting gears of speed changing and direction reversing transmissions for automotive or other purposes.

The basic design of the mechanism, according to the present invention, comprises three gear shifting forks mounted upon three gear shifting rails with the usual interlocks and position poppets which may all be carried by the gear shift control mounting member. Each gear shifting rail also has mounted upon it a shift lever lug, arranged so that the gear shift lever may select any one of the shift lugs as chosen by the operator, whereby the gear shift lever may be used to move the selected gears into mesh at the will of the operator.

The gear shifting lever is attached to the gear shift shaft which may be rotated for the selection of the desired shift lug, whereupon the shift lug and its associated rail fork and the shiftable gear or clutch may be moved into engagement, and the desired ratio, or direction of drive thereby established.

A ratio selector cylinder with piston means actuated by fluid pressure, and preferably air pressure, the air being compressible and providing more of the feel of manual shifting, is employed to provide the desired turning or rotation of the gear shifting lever to select the gear ratio desired to be engaged.

A gear shifting cylinder with piston means, also actuated by fluid pressure, and preferably air pressure, is then used to shift the ratio and direction engagement members so as to effect their engagement.

The ratio selector and gear shifting cylinders and their piston means are of novel construction and operate effectively to provide the desired results.

The air pressure is admitted or vented through the air and vent ports into and from the ratio selector and gear shifting cylinders by an air control valve assembly so as to cause the piston means to move as desired to select the desired gear ratio or direction of drive and to shift the ratio and direction engagement members so as to effect their engagement. The air control valve assembly may be mounted upon the gear shift assembly with air lines leading to the various ports of the ratio selector and gear shifting cylinders.

The control air valve assembly may be actuated as desired by a steering wheel column mounted gear shift control lever assembly by which the selected gear ratios may be chosen by the operator, and his selection of the transmission ratio may be transmitted from this control lever assembly to the control air valve assembly, for example, by two flexible armored cable assemblies, which may be led from the operator's cab or position through the floor of the vehicle and thence back to the transmission and the control air valve assembly.

Thus, any relative movement between the transmission and, for example, the cab of the vehicle will not affect the positioning of the valve as selected by the operator. This will allow the cab to be hinged upon the main frame of the vehicle so that it may be tilted out of position for service work on the engine, etc., without requiring any disassembly of the gear shift means, since the flexible control cables will merely flex and not move the shifting means of the valve assembly.

Another feature of the present invention resides in the provision of a lock plunger for assuring that the gears will always be returned to neutral before any other shift can be selected, for example, by the operator trying to select a second engagement before engaged gears are fully released. This is important, since there should be some slight lag between the operator moving the hand control lever and the air pressure moving the gears to neutral.

Further features and advantages and adaptations of the invention will be apparent from the following detailed description, taken in connection with the accompanying drawings, it being understood that the invention is limited only within the scope of the appended claims and not to the particular embodiments selected for illustration.

In the drawings:

FIGURE 1 is a top plan view, partially broken away and in section showing one illustrative form of shifter mechanism assembly and air control valve assembly embodying the present invention;

FIGURE 2 is a side view of the shifter mechanism assembly and air control valve assembly illustrated in FIGURE 1;

FIGURE 3 is an end view of the shifter mechanism assembly taken substantially along the line 3—3 of FIGURE 2;

FIGURE 4 is a sectional view through one set of the pressure and vent valves of the air control valve assembly;

FIGURE 5 is a view partially in section and partially in elevation showing one form of steering column mounted hand control assembly for actuating the air control valve assembly;

FIGURE 6 is a view of the assembly illustrated in FIGURE 5, with the lever and cover removed; and FIGURE 7 is a fragmentary perspective view showing the structure and relation of the plungers 73, 74 and lever 76.

Referring to the drawings, the shifter mechanism selected for illustration comprises three gear shifting forks 10, 11 and 12, shown fragmentarily and more or less diagrammatically in FIGURE 3.

The gear shifting forks 10, 11 and 12 are mounted on three gear shifting rails 13, 14 and 15, with the usual interlocks and position poppets which are all carried by the gear shaft control mounting member. Each gear shifting rail 13, 14 and 15 also has mounted upon it the usual shift lever lugs 16, 17 and 18, respectively, arranged so that the gear shifting lever 20 may select any one of the shift lugs 16, 17 or 18 as chosen by the operator, whereby the gear shifting lever 20 may be used to move the selected gears (not shown) into mesh at the will of the operator.

The transmission through which the drive ratio or direction of drive is changed by the shifter mechanism, according to the present invention, has a housing 21 open at the top. A hollow cover 22 closed at the top by a top wall 23 and having depending marginal flanges 24 flanged outwardly at their lower ends at 25 is secured to the transmission housing 21, for example, by a plurality of bolts 26.

Within and constituting a part of the cover 22 is a shifter cylinder 28. Extending axially at one end into the cylinder 28 is a gear shifting shaft 29 which may be rotated for selection of the desired shift lever lug 16, 17 or 18, after which the shaft 29 may be shifted longitudinally along its axis to move the selected shift lug 16, 17 or 18, and its associated rail fork 13, 14 or 15 and the shiftable gear associated therewith (not shown) into engagement to establish the desired gear ratio or change in direction of the drive through the transmission.

As illustrated in FIGURE 3, the shift lugs 16 and 17 extend laterally and the free ends thereof terminate with the lug 17 overlying the lug 18 on the rail 15 and the lug 16 overlying the lug 17 and with the lugs spaced or sufficiently clear of one another for relative movement.

The gear shifting lever 20 is attached to the gear shifting shaft 29 for rotation and longitudinal movement with the shaft 29 along its axis. The outer end 32 of the lever 20 is adapted by turning movement of the shaft 29 and the lever 20 to be moved selectively into and out of position for cooperation with the selected lug 16, 17 or 18. Then, by longitudinal movement of the shaft 29 and the accompanying movement of the lever 20 the selected shift lug 16, 17 or 18 and its associated rail fork 13, 14 or 15 is shifted to provide the desired gear ratio or change in direction of the drive.

Within and constituting a part of the cover 22 is a gear ratio selector cylinder 34. Extending axially at one end into the cylinder 34 is a gear selecting shaft 35. The outer end of the shaft 35 has pivotal connection at 36 with a link 37, the other end of which link 37 has pivotal connection at 38 with an arm 39 attached to the hub 40 to which the gear shifting lever 20 is attached, as illustrated in FIGURE 3. Thus, longitudinal movement of the shaft 35 turns the lever 20 to move the outer end 32 thereof into and out of position for cooperation with the selected shift lug 16, 17 or 18.

A smaller power piston 42 attached to the shaft 35 operates slidingly in a smaller cylinder bore 43 of the selector cylinder 34. A larger neutral control loose piston 44 slidably assembled on the shaft 35 operates slidingly in a larger cylinder bore 45 coaxial with the smaller cylinder bore 43 and into which the bore 43 opens. The power piston 42 has a hub extension 48 about the piston shaft 35 of the same length as the movement of the lever 20 from position for cooperation with lug 18 to position for cooperation with lug 17 so that with air pressure admitted to ports 50 and 51 and air vented from port 52, the larger loose piston 44 will be forced against the shoulder 43 formed where the end of the smaller bore 43 meets the adjacent end of the larger bore 45 while the power piston 42 will be forced against the loose piston 44. The loose piston 44 being of greater area than the power piston 42 will prevent the power piston 42 from moving beyond this mid-point position.

The hub extension 48 stops the piston 42 in the smaller cylinder bore 43 with sufficient bore left to allow the power piston 42 to move another movement which occurs when air pressure is admitted to port 51, while both ports 50 and 52 are vented. The third position is obtained by admitting air pressure to both ports 50 and 52, while port 51 is opened to vent. Thus, the three shift lugs 16, 17 and 18 may be selected by actuation of the air valve assembly as above described.

The transmission to be shifted by the shifter mechanism of the present invention has all five forward gear ratios, i.e. ratios "1st," "2nd," "3rd," "4th" and "5th," as illustrated diagrammatically in FIGURE 5 selected by shift clutches which all require 9/16 inch shift travel, while the reverse ratio 'Rev' is obtained by "clash gears" and requires 17/32 inch shift travel. This, therefore, requires three shifts, i.e., "1st," "3rd" and "5th" in one direction of 9/16 inch travel and two, i.e. "2nd" and "4th" in the other direction of 9/16 inch travel, plus one shift, i.e., "Rev." in this other direction of 17/32 inch travel to "clash shift" reverse engagement.

Therefore, the smaller power piston 55 is mounted in a smaller bore 56, while a larger neutral control loose piston 57 is mounted in a larger cylinder bore 58 of the shifter cylinder 28. The power piston 55 is attached to the gear shifting shaft 29. The neutral control loose piston 57 is slidably assembled on the shaft 29, and operates slidingly in the bore 58.

In this use, a hub extension 60 formed on the loose piston 57 about the shaft 29 spaces the piston 55 within the smaller cylinder bore 56 sufficiently to allow it to move from the neutral position to the position required to engage the "1st," "3rd" and "5th" gear ratios, and still remain in the smaller cylinder bore 56.

The ports 50 and 50' are used in common with the control of the gear ratio selector cylinder 34 and the shifter cylinder 28.

The shaft end 62 is formed on the other side of the piston 55 to form a second mid-stroke stop against the second loose piston 64, which operates slidingly in the smaller cylinder bore 56. This provides the correct distance of travel for engaging "2nd" and "4th" gear ratios. Reverse ratio, i.e., "Rev." may properly be shifted by allowing the loose piston 64 to be moved out of the way and allowing the power piston 55 to travel this longer distance.

A stop ring 66 is provided, so as properly to locate the piston 64 to act as a stop for the "2nd" and "4th" shifts. In this case, the force acting on the piston 64 is the complete area of the smaller cylinder bore 56, while the force acting on the smaller piston 55 is the same area less the area of the piston or gear shifting shaft 29. It will be noted for all shifts from "2nd" through "5th" that air pressure may be admitted into or through port 50', and that for the gear ratio selector cylinder 34, port 50 also requires air pressure to be admitted into it for these same four selections. The ports 50 and 50' are, therefore, common ports for both cylinders 28 and 34, and a saving of one valve set is provided.

When air pressure is opened to ports 68 and 69, and air is vented from port 70, then the power shift means will be held in neutral. At this position, the gear shifting shaft 29 will position a notch 72 (FIGURE 2) so that the neutral plunger 73 will project down into this notch 72, thereby permitting the lock plunger 74 in the valve assembly to be withdrawn from the notch 75 in a gear shift lever 76, so that it is possible to move this lever 76 to provide a gear shift engagement.

However, whenever the gear shifting shaft 29 has moved from the neutral position, a spring 80 in the plunger 74 assembly will be compressed, and the plunger 74 will be spring pressed against the surface of the lever 76. As soon as the gear shift lever 76 is shifted to its neutral position, the plunger 74 will engage the notch 75 in the gear shift lever 76, and prevent any further movement of this lever until the shifter cylinder 28 has moved the gear shifting shaft 29 again to neutral position, whereupon neutral plunger 73 will engage in the notch 72 and thereby permit the lock plunger 74 to be withdrawn from the notch 75, so that it is possible to move the lever 76 to provide a gear shift engagement.

Thus, it is assured that the gears will always be returned to neutral before any other shift can be selected by the operator, for example, by endeavoring to select a second or other engagement before engaged gears are fully released. This interlock is important, since there must be some slight lag between the operator moving his hand control and the air pressure moving the gears to neutral.

Common ports 50 and 50' of the gear ratio selector cylinder 34 and the shifter cylinder 28 are connected to tubes 82 and 83 leading to a T-coupling 84, which is connected by a tube 85 and a suitable connector 86 to a port 87 of an air control valve assembly 88. The ports 52 and 51 of the gear ratio selector cylinder 34 are connected to tubes 89 and 90, the opposite ends of which are connected through suitable connectors 91 and 92 to ports 93 and 94 of the control valve assembly 88. The ports 68, 70 and 69 are connected to tubes 95, 96 and 97, the opposite ends of which are connected through suitable connectors 98, 99 and 100 to ports 101, 102 and 103 of the control valve assembly, all as more or less diagrammatically illustrated in FIGURE 1.

As illustrated more or less diagrammatically in FIGURES 1 and 4, the control valve assembly comprises a base plate 110, in which six pairs of identical valve assemblies 111 are assembled. The six pressure control valve assemblies 111 are all connected to a common air pressure line 112. The six vent control valve assemblies 111 are connected to six diagonal connecting holes 113, which in turn connect to the six service lines connected to the ports 87, 93, 94, 101, 102 and 103, whereby any air pressure in them may be vented to the atmosphere whenever desired through the common vent line 115.

Mounted upon the base plate 110 is the upper plate 116, into which six pairs of actuator plungers are assembled so as to actuate the six pairs of valve assemblies 111 as desired. The six service lines and the vent line 115 may be machined into the plate 116.

O ring seals 118, 119, 120, 121, 122 and 123 are employed to prevent air pressure from leaking about the valves, push rods and the joint between the plates 110 and 116.

In order to actuate the six pairs of valves as desired, an actuator plate 124 is seated upon the upper surface of the upper plate 116 so that the valve push rods 125 will open their associated valves. Whenever a valve is to be closed, a countersink 126 is located so that the valve push rod 125 may project into such countersinks 126, whereby the associated valve assemblies 111 are closed and pressure cannot be admitted to that service line, or, in the case of the vent valves, air from the service line cannot be vented. The valve push rods 125 have the O rings 123 about them to prevent air leaking through the push rod holes, while the springs 127 urge the push rods 125 against the actuator plate 124, or into the countersinks 126 therein.

The valve seat plungers 128 seat against the valve seat rings 129 to seal the air within the valves. The springs 130 urge the seat plungers 128 to cause them to seal the valves from passing air through the valves 111. In both cases, any air pressure within the valves add to these spring forces, and aid in creating a sure seal action. The actuator plate 124 is located in place, and held in its true position by the selector member 131 with its two fingers 132 projecting into slots 133 formed in the upper face of the actuator plate 124. These two fingers 132 are also used to force the actuator plate 124 to move sidewise whenever the selector member is actuated by its operating plunger 134. The selector member 131 is located in its proper place by two guide rods 135, and due to the two guide slots 135', the selector member 131 and the actuator plate 124 may be positioned in three positions, i.e., the center position and a movement to both sides.

Mounted about one of the guide rods 135 is the shift lever 76, which has one arm formed to project into a crosswise slot 137 in the actuator plate 124, while its other arm projects at right angles whereby the lever operating plunger 138 can force the actuator plate 124 to be moved fore and aft from its center position, thereby providing for the plate 124 to be positioned at three positions, the guide means forcing the plate 124 to move in a true manner through the cooperation of its fingers 132 in the slots 133, thus allowing such fore and aft movement of plate 124, but preventing it from having any rotational movement.

Thus the twelve valve assemblies 111 can each be actuated by nine positions of the actuator plate 124, causing the various valve actuations. Countersinks are provided wherever the valve is desired closed, and omitted wherever it is desired to actuate the valve.

When a valve is to remain closed, even though a shift of the actuator plate 124 is required, the two countersinks are merely elongated so that the valve does not have to open and reclose during that movement.

In order to give a definite feel to the position of the actuator plate 124, a poppet spring plate 139 is assembled into place about the two guide rods 135, with the two poppet fingers 140 pressing into the poppet countersinks 141. The two bosses 142 are machined to hold the actuator plate 124 and the selector member 131, as well as the spring poppet plate 139 down in position, but with sufficient clearance for free movement of the actuator plate 124. This also holds the poppet fingers 140 into their poppet countersinks 141.

As previously described, the outer periphery of the lever 76 is provided with a notch 75 associated with the interlock plunger 74, which when pressed into the notch 75 will prevent any movement of the lever 76 while so locked.

The neutral plunger 73 is connected, for example, to an arm 145 on a rotatable shaft 146 having another arm 147 connected to the plunger 74 as shown in FIGURE 2.

All of the actuating means are retained in position by the cover member 149 and capscrews 150, as shown in FIGURE 1, which also holds the complete assembly together. The capscrew located at hole 151 also clamps the valve parts together, as well as being used as a mounting screw. Two other screws may be used for mounting the valve through the holes 152. The two operating plungers 134 and 138 may be operated by armored flexible cables which are indicated more or less diagrammatically at 153 and 154, and are associated, for example, with the steering column mounted hand control assembly shown in FIGURES 5 and 6.

Suffice it for purposes of the present description to state that the hand control assembly comprises, for example, a housing 155 mounted by a bracket 156 and bolts 157 on the steering column 158.

A shifter lever 160 mounted by ball and socket means at 161 in the tubular part 162 of the cover 163 and spring pressed at 164 provides the hand control means. A selector member 165, guided by guide pins 166 extending through guide slots 167 in the member 165 is actuated in the direction of the arrows 169 in FIGURE 6 to positions between "Rev." and "1st"; "4th" and "5th" and "2nd" and "3rd" ratios by appropriately swinging the lever 160 about its ball and socket means at 161; the inner end of the lever engaging in the member 165 at 170.

An actuator plate 172 is shiftable in the direction of the arrows 173 in FIGURE 6 by the lever 160. The plate 172 has a cross slot 174 in which one arm 175 of a shift lever 176 engages. The lever 176 is mounted on one of the guide pins 166 and has another arm 178 projecting at right angles therefrom. The armored flexible cable 153 is connected to the selector member 165 as indicated diagrammatically in FIGURE 6, and the other armored cable 154 is connected to the arm 178 of the lever 176, as also indicated diagrammatically in FIGURE 6.

Thus, by swinging the lever 160 to position between "Rev." and "1st"; or between "4th" and "5th"; or between "2nd" and "3rd," the valves are operated to move the end 32 of the lever 20 for cooperation with the desired shift lug 16, 17 or 18 through the action of the air pressure on the piston means within the selector cylinder 28. And, by swinging the lever 160 to move the actuator plate 172 in the direction of the arrows 173 in FIGURE 6, the lever 176 is swung about the pin 166 on which it is mounted to actuate the valves and shift the rail 13, 14 or 15 and fork 10, 11 or 12 to shift the gears into "Rev." or "1st"; or "4th" or "5th"; or "2nd" or "3rd" ratio, depending upon the selected position of the end 32 of the lever 20.

The embodiment of the invention disclosed in the drawing and the specification are for illustrative purposes only, and it is to be expressly understood that said drawings and the specification are not to be construed as a definition of the limits or scope of the invention, reference being had to the appended claims for that purpose.

I claim:

1. A fluid powered shifter mechanism comprising, in combination, a plurality of gear shifting rails, gear shifting forks and shift lever lugs mounted on said rails for longitudinal gear shifting movements, a gear shifting shaft mounted for turning movement and for movement longitudinally of its axis, a gear shifting lever attached to said shaft for turning movement and for longitudinal movement with said shaft, gear ratio selector means comprising a cylinder for applying fluid pressure to turn said gear shifting lever into positions for cooperation with said shift lever lugs, shifter means comprising a cylinder for applying fluid pressure to move said gear shifting shaft and said gear shifting lever longitudinally, a control valve assembly operable to control the application of fluid pressure to said gear ratio selector means and to said shifter means, and a hand control assembly outside the path of fluid pressure and connected mechanically to said control valve assembly for controlling the application of fluid pressure to said gear ratio selector means and to said shifter means.

2. A fluid pressure shifter mechanism according to claim 1, wherein the hand control assembly is constructed for mounting on the steering column and includes a shifter lever mounted by ball and socket means.

3. A fluid pressure shifter mechanism according to claim 1, wherein the mechanical connection of the hand control assembly to the control valve assembly comprises armored flexible cables connected to selector and actuator members of the hand control assembly and to operating members of the control valve assembly.

4. A fluid pressure shifter mechanism according to claim 1, wherein the hand control assembly has selector and actuator means, one of which is movable across the path of movement of the other of said members and the mechanical connection of the hand control assembly comprises armored cables connected to impart movements of said selector and actuator means to operating members of the valve control assembly.

5. A fluid powered shifter mechanism comprising, in combination, a plurality of gear shifting rails, gear shifting forks and shift lever lugs mounted on said rails for longitudinal gear shifting movements, a gear shifting shaft mounted for turning movement and for movement longitudinally of its axis, a gear shifting lever attached to said shaft for turning movement and for longitudinal movement with said shaft, means for applying fluid pressure to turn said gear shifting lever into positions for cooperation selectively with said shift lever lugs, means for applying fluid pressure to move said gear shifting shaft and said gear shifting lever longitudinally to impart a longitudinal shifting movement to said gear shifting forks selectively, as determined by the shift lever lug with which said gear shifting lever is turned to cooperate, the means for applying fluid pressure to turn the gear shifting lever into positions for cooperation selectively with said shift lever lugs comprises a gear ratio selector cylinder having therein a power piston fastened upon a piston shaft, and a loose piston slidably assembled upon said piston shaft and positioned in said cylinder.

6. A fluid powered shifter mechanism comprising, in combination, a plurality of gear shifting rails, gear shifting forks and shift lever lugs mounted on said rails for longitudinal gear shifting movements, a gear shifting shaft mounted for turning movement and for movement longitudinally of its axis, a gear shifting lever attached to said shaft for turning movement and for longitudinal movement with said shaft, means for applying fluid pressure to turn said gear shifting lever into positions for cooperation selectively with said shift lever lugs, means for applying fluid pressure to move said gear shifting shaft and said gear shifting lever longitudinally to impart a longitudinal shifting movement to said gear shifting forks selectively, as determined by the shift lever lug with which said gear shifting lever is turned to cooperate, the means for applying fluid pressure to turn the gear shifting lever into positions for cooperation selectively with said shift lever lugs comprises a gear ratio selector cylinder having a smaller bore opening into a larger bore, a shoulder between said bores, a piston shaft extending into said cylinder, a smaller power piston fastened upon said shaft and operable in said smaller bore, and a larger loose piston slidably assembled upon said shaft and operable in said larger bore, said cylinder having a first port through which air is adapted to enter at the outer end of the loose piston; also a second port through which air is adapted to enter at the outer end of the power piston and a third port through which air is adapted to be vented from an intermediate position to force said loose piston against said shoulder and the power piston against said loose piston, said second port being adapted for entry therethrough of air pressure at the outer end of the power piston, while both said first and third ports are vented to provide for another movement of said power piston.

7. A fluid powered shifter mechanism comprising, in combination, a plurality of gear shifting rails, gear shifting forks and shift lever lugs mounted on said rails for longitudinal gear shifting movements, a gear shifting shaft mounted for turning movement and for movement longitudinally of its axis, a gear shifting lever attached to said shaft for turning movement and for longitudinal movement with said shaft, means for applying fluid pressure to turn said gear shifting lever into positions for cooperation selectively with said shift lever lugs, means for applying fluid pressure to move said gear shifting shaft and said gear shifting lever longitudinally to impart a longitudinal shifting movement to said gear shifting forks selectively, as determined by the shift lever lug with which said gear shifting lever is turned to cooperate, the means for applying fluid pressure to turn the gear shifting lever into positions for cooperation selectively with said shift lever lugs comprises a gear ratio selector cylinder having a smaller bore opening into a larger bore, a shoulder between said bores, a piston shaft extending into said cylinder, a smaller powered piston fastened upon said shaft and operable in said smaller bore, and a larger loose piston slidably assembled upon said shaft and operable in said larger bore, said cylinder having a first port through which air is adapted to enter at the outer end of the loose piston; also a second port through which air is adapted to enter at the outer end of the power piston and a third port through which air is adapted to be vented from an intermediate position to force said loose piston against said shoulder and the power piston against said loose piston, said second port being adapted for entry therethrough of air pressure at the outer end of the power piston, while both said first and third ports are vented to provide for another movement of said power piston, said first and third ports being adapted for entry therethrough of air pressure at the outer end of a loose piston and at intermediate position, while said second port is vented to provide a further movement of said power piston.

8. A fluid powered shifter mechanism comprising, in combination, a plurality of gear shifting rails, gear shifting forks and shift lever lugs mounted on said rails for longitudinal gear shifting movements, a gear shifting shaft mounted for turning movement and for movement longitudinally of its axis, a gear shifting lever attached to said shaft for turning movement and for longitudinal movement with said shaft, means for applying fluid pressure to turn said gear shifting lever into positions for cooperation selectively with said shift lever lugs, means for applying fluid pressure to move said gear shifting shaft and said gear shifting lever longitudinally to impart a longitudinal shifting movement to said gear shifting forks selectively, as determined by the shift lever lug with which said gear shifting lever is turned to cooperate, the means for applying fluid pressure to turn the gear shifting lever into positions for cooperation selectively with said shift lever lugs comprises a gear ratio selector cylinder having a smaller bore opening into a larger bore, a shoulder between said bores, a piston shaft extending into said cylinder, a smaller power piston fastened upon said shaft and operable in said smaller bore, a larger loose piston slidably assembled upon said shaft and operable in said larger bore, said cylinder having a first port through which air is adapted to enter at the outer end of the loose piston; also a second port through which air is adapted to enter at the outer end of the power piston and a third port through which air is adapted to be vented from an intermediate position to force said loose piston against said shoulder and the power piston against said loose piston, said second port being adapted for entry therethrough of air pressure at the outer end of the power piston, while both said first and third ports are vented to provide for another movement of said power piston, said first and third ports being adapted for entry therethrough of air pressure at the outer end of the loose piston and at intermediate position, while said second port is vented to provide a further movement of said power piston, and a hub on the power piston about the piston shaft and cooperable with said loose piston, said hub being of the same length longitudinally along the piston shaft as the movement required for turning the gear shifting lever from one position to another position.

9. A fluid powered shifter mechanism comprising, in combination, a plurality of gear shifting rails, gear shifting forks and shift lever lugs mounted on said rails for longitudinal gear shifting movements, a gear shifting shaft mounted for turning movement and for movement longitudinally of its axis, a gear shifting lever attached to said shaft for turning movement and for longitudinal movement with said shaft, means for applying fluid pressure to turn said gear shifting lever into positions for cooperation selectively with said shift lever lugs, means for applying fluid pressure to move said gear shifting shaft and said gear shifting lever longitudinally to impart a longitudinal shifting movement to said gear shifting forks selectively, as determined by the shift lever lug with which said gear shifting lever is turned to cooperate, the means for applying fluid pressure for moving said gear shifting shaft comprises a shifting cylinder into which the gear shifting shaft extends, a power piston fastened to said gear shifting shaft and operable in a smaller bore in said shifting cylinder, and a loose piston slidably assembled on said shaft and operable in a larger bore in said shifting cylinder.

10. A fluid powered shifter mechanism comprising, in combination, a plurality of gear shifting rails, gear shifting forks and shift lever lugs mounted on said rails for longitudinal gear shifting movements, a gear shifting shaft mounted for turning movement and for movement longitudinally of its axis, a gear shifting lever attached to said shaft for turning movement and for longitudinal movement with said shaft, means for applying fluid pressure to turn said gear shifting lever into positions for cooperation selectively with said shift lever lugs, means for applying fluid pressure to move said gear shifting shaft and said gear shifting lever longitudinally to impart a longitudinal shifting movement to said gear shifting forks selectively, as determined by the shift lever lug with which said gear shifting lever is turned to cooperate, the means for applying fluid pressure for moving said gear shifting shaft comprises a shifting cylinder into which the gear shifting shaft extends, a power piston fastened to said gear shifting shaft and operable in a smaller bore in said shifting cylinder, a loose piston slidably assembled on said shaft and operable in a larger bore in said shifting cylinder, a shoulder between said smaller and larger bores, and a hub extension on said loose piston and cooperable with said power piston to space said power piston within the smaller cylinder bore sufficiently to allow it to move from neutral position to different gear ratio positions.

11. A fluid powered shifter mechanism comprising, in combination, a plurality of gear shifting rails, gear shifting forks and shift lever lugs mounted on said rails for longitudinal gear shifting movements, a gear shifting shaft mounted for turning movement and for movement longitudinally of its axis, a gear shifting lever attached to said shaft for turning movement and for longitudinal movement with said shaft, means for applying fluid pressure to turn said gear shifting lever into positions for cooperation selectively with said shift lever lugs, means for applying fluid pressure to move said gear shifting shaft and said gear shifting lever longitudinally to impart a longitudinal shifting movement to said gear shifting forks selectively, as determined by the shift lever lug with which said gear shifting lever is turned to cooperate, the means for applying fluid pressure for moving said gear shifting shaft comprises a shifting cylinder into which the gear shifting shaft extends, a power piston fastened to said gear shifting shaft and operable in a smaller bore in said shifting cylinder, a loose piston slidably assembled on said shaft and operable in a larger bore in said shifting cylinder, a shoulder between said smaller and larger bores, a hub extension on said loose piston, and cooperable with said power piston to space said power piston within the smaller cylinder bore sufficiently to allow it to move from neutral position to different gear ratio positions, a second loose piston slidably assembled on said gear shifting shaft and operable in said smaller cylinder bore, and a hub portion on said power piston and constituting a second mid-stroke stop against said second loose piston so as to provide the correct distance of travel for movement to other gear ratio positions.

12. A fluid powered shifter mechanism comprising, in combination, a plurality of gear shifting rails, gear shifting forks and shift lever lugs mounted on said rails for longitudinal gear shifting movements, a gear shifting shaft mounted for turning movement and for movement longitudinally of its axis, a gear shifting lever attached to said shaft for turning movement and for longitudinal movement with said shaft, means for applying fluid pressure to turn said gear shifting lever into positions for cooperation selectively with said shift lever lugs, means for applying fluid pressure to move said gear shifting shaft and said gear shifting lever longitudinally to impart a longitudinal shifting movement to said gear shifting forks selectively, as determined by the shift lever lug with which said gear shifting lever is turned to cooperate, the means for applying fluid pressure for moving said gear shifting shaft comprises a shifting cylinder into which the gear shifting shaft extends, a power piston fastened to said gear shifting shaft and operable in a smaller bore in said shifting cylinder, a loose piston slidably assembled on said shaft and operable in a larger bore in said shifting cylinder, a shoulder between said smaller and larger bores, a hub extension on said loose piston and cooperable with said power piston to space said power piston within the smaller cylinder bore sufficiently to allow it to move from neutral position to different gear ratio positions, a second loose piston slidably assembled on said gear shifting shaft and operable in said smaller cylinder bore, a hub portion on said power piston and constituting a second mid-stroke stop against said second loose piston so as to provide the correct distance of travel for movement to other gear ratio positions, and a stop ring for locating said second loose piston to act as a stop for said other gear ratio positions.

13. A fluid powered shifter mechanism comprising, in combination, a plurality of gear shifting rails, gear shifting forks and shift lever lugs mounted on said rails for longitudinal gear shifting movements, a gear shifting shaft mounted for turning movement and for movement longitudinally of its axis, a gear shifting lever attached to said shaft for turning movement and for longitudinal movement with said shaft, means for applying fluid pressure to turn said gear shifting lever into positions for cooperation selectively with said shift lever lugs, means for applying fluid pressure to move said gear shifting shaft and said gear shifting lever longitudinally to impart a longitudinal shifting movement to said gear shifting forks selectively, as determined by the shift lever lug with which said gear shifting lever is turned to cooperate, the means for applying fluid pressure to move the gear shifting shaft comprises a shifting cylinder having a smaller bore opening into a larger bore, a shoulder between said bores, a smaller power piston fastened upon said gear shifting shaft and operable in said smaller bore, and a larger loose piston slidably assembled upon said shaft and operable in said larger bore, said cylinder having a first port through which air is adapted to enter at the outer end of the loose piston; and also a second port through which air is adapted to enter at the outer end of the power piston and a third port through which air is adapted to be vented from an intermediate position to position the gear shifting shaft in neutral position.

14. A fluid powered shifter mechanism comprising, in combination, a plurality of gear shifting rails, gear shifting forks and shift lever lugs mounted on said rails for longitudinal gear shifting movements, a gear shifting shaft mounted for turning movement and for movement longitudinally of its axis, a gear shifting lever attached to said shaft for turning movement and for longitudinal movement with said shaft, means for applying fluid pressure to turn said gear shifting lever into positions for cooperation selectively with said shift lever lugs, means for applying fluid pressure to move said gear shifting shaft and said gear shifting lever longitudinally to impart a longitudinal shifting movement to said gear shifting forks selectively, as determined by the shift lever lug with which said gear shifting lever is turned to cooperate, the means for applying fluid pressure to move the gear shifting shaft comprises a shifting cylinder having a smaller bore opening into a larger bore, a shoulder between said bore, a smaller power piston fastened upon said gear shifting shaft and operable in said smaller bore, a larger loose piston slidably assembled upon said shaft and operable in said larger bore, said cylinder having a first port through which air is adapted to enter at the outer end of the loose piston; and also a second port through which air is adapted to enter at the outer end of the power piston and a third port through which air is adapted to be vented from an intermediate position to position the gear shifting shaft in neutral position, and a neutral plunger, said gear shifting shaft when in neutral position positioning a notch into which said plunger is engageable.

15. A fluid powered shifter mechanism comprising, in combination, a plurality of gear shifting rails, gear shifting forks and shift lever lugs mounted on said rails for longitudinal gear shifting movements, a gear shifting shaft mounted for turning movement and for movement longitudinally of its axis, a gear shifting lever attached to said shaft for turning movement and for longitudinal movement with said shaft, means for applying fluid pressure to turn said gear shifting lever into positions for cooperation selectively with said shift lever lugs, means for applying fluid pressure to move said gear shifting shaft and gear shifting lever longitudinally to impart a longitudinal shifting movement to said gear shifting forks selectively, as determined by the shift lever lug with which said gear shifting lever is turned to cooperate, the means for applying fluid pressure to move the gear shifting shaft comprises a shifting cylinder having a smaller bore opening into a larger bore, a shoulder between said bores, a smaller power piston fastened upon said gear shifting shaft and operable in said smaller bore, a larger loose piston slidably assembled upon said shaft and operable in said larger bore, said cylinder having a first port through which air is adapted to enter at the outer end of the loose piston; also a second port through which air is adapted to enter at the outer end of the power piston and a third port through which air is adapted to be vented from an intermediate position to position the gear shifting shaft in neutral position, a neutral plunger, said gear shifting shaft when in neutral position positioning a notch into which said plunger is engageable, a gear shift lever having a notch, and a lock plunger connected to said neutral plunger and engageable in the notch in said gear shifting lever to prevent movement of said gear shifting lever until the gear shifting shaft is moved into neutral position for engagement of said neutral plunger in said notch.

16. A fluid powered shifter mechanism comprising, in combination, a plurality of gear shifting rails, gear shifting forks and shift lever lugs mounted on said rails for longitudinal gear shifting movements, a gear shifting shaft mounted for turning movement and for movement longitudinally of its axis, a gear shifting lever attached to said shaft for turning movement and for longitudinal movement with said shaft, means for applying fluid pressure to turn said gear shifting lever into positions for cooperation selectively with said shift lever lugs, means for applying fluid pressure to move said gear shifting shaft and said gear shifting lever longitudinally to impart a longitudinal shifting movement to said gear shifting forks selectively, as determined by the shift lever lug with which said gear shifting lever is turned to cooperate, the means for applying fluid pressure to move the gear shifting shaft comprises a shifting cylinder having a smaller bore opening into a larger bore, a shoulder between said bores, a smaller power piston fastened upon said gear shifting shaft and operable in said smaller bore, and a larger loose piston slidably assembled upon said shaft and operable in said larger bore, said cylinder having a first port through which air is adapted to enter at the outer end of the loose piston; also a second port through which air is adapted to enter at the outer end of the power piston and a third port through which air is adapted to be vented from an intermediate position to position the gear shifting shaft in neutral position, said second port being adapted for entry therethrough of air pressure at the outer end of the power piston, while both said first and third ports are vented to allow movement of said power piston in one direction to different gear ratio positions.

17. A fluid powered shifter mechanism comprising, in combination, a plurality of gear shifting rails, gear shifting forks and shift lever lugs mounted on said rails for longitudinal gear shifting movements, a gear shifting shaft mounted for turning movement and for movement longitudinally of its axis, a gear shifting lever attached to said shaft for turning movement and for longitudinal movement with said shaft, means for applying fluid pressure to turn said gear shifting lever into positions for cooperation selectively with said shift lever lugs, means for applying fluid pressure to move said gear shifting shaft and said gear shifting lever longitudinally to impart a longitudinal shifting movement to said gear shifting forks selectively, as determined by the shift lever lug with which said gear shifting lever is turned to cooperate, the means for applying fluid pressure to move the gear shifting shaft comprises a shifting cylinder having a smaller bore opening into a larger bore, a shoulder between said bores, a smaller power piston fastened upon said gear shifting shaft and operable in said smaller bore, and a larger loose piston slidably assembled upon said shaft and operable in said larger bore, said cylinder having a first port through which air is adapted to enter at the outer end of the loose piston; also a second port through which air is adapted to enter at the outer end of the power piston and a third port through which air is adapted to be vented from an intermediate position to position the gear shifting lever in neutral position, said second port being adapted for entry therethrough of air pressure at the outer end of the power piston, while both said first and third ports are vented to allow movement of said power piston in one direction to different gear ratio positions, said third port being adapted for entry of air pressure at the intermediate position, while said first port is admitting air pressure and said second port is vented to allow movement of said power piston in the opposite direction to further gear ratio positions.

18. A fluid powered shifter mechanism comprising, in combination, a plurality of gear shifting rails, gear shifting forks and shift lever lugs mounted on said rails for longitudinal gear shifting movements, a gear shifting shaft mounted for turning movement and for movement longitudinally of its axis, a gear shifting lever attached to said shaft for turning movement and for longitudinal movement with said shaft, means for applying fluid pressure to turn said gear shifting lever into positions for cooperation selectively with said shift lever lugs, means for applying fluid pressure to move said gear shifting shaft and said gear shifting lever longitudinally to impart a longitudinal shifting movement to said gear shifting forks selectively, as determined by the shift lever lug with which said gear shifting lever is turned to cooperate, the means for applying fluid pressure to move the gear shifting shaft comprises a shifting cylinder having a smaller bore opening into a larger bore, a smaller power piston fastened upon said gear shifting shaft and operable in said smaller bore, a larger loose piston slidably assembled upon said shaft and operable in said larger bore, said cylinder having a first port through which air is adapted to enter at the outer end of the loose piston; also a second port through which air is adapted to enter at the outer end of the power piston and a third port through which air is adapted to be vented from an intermediate position to position the gear shifting shaft in neutral position, said second port being adapted for entry therethrough of air pressure at the outer end of the power piston, while both said first and third ports are vented to allow movement of said power piston in one direction to different gear ratio positions, said third port being adapted for entry of air pressure at the intermediate position, while said first port is admitting air pressure and said second port is vented to allow movement of said power piston in the opposite direction to further gear ratio positions, and a second loose piston slidably assembled on said gear shifting shaft and operable in said smaller bore and acting as a stop for the shifts in said opposite direction.

19. A fluid powered shifter mechanism comprising, in combination, a plurality of gear shifting rails, gear shifting forks and shift lever lugs mounted on said rails for longitudinal gear shifting movements, a gear shifting shaft mounted for turning movement and for movement longitudinally of its axis, a gear shifting lever attached to said shaft for turning movement and for longitudinal movement with said shaft, means for applying fluid pressure to turn said gear shifting lever into positions for cooperation selectively with said shift lever lugs, means for applying fluid pressure to move said gear shifting shaft and said gear shifting lever longitudinally to impart a longitudinal shifting movement to said gear shifting forks selectively, as determined by the shift lever lug with which said gear shifting lever is turned to cooperate, the means for applying fluid pressure to move the gear shifting shaft comprises a shifting cylinder having a smaller bore opening into a larger bore, a smaller power piston fastened upon said gear shifting shaft and operable in said smaller bore, a larger loose piston slidably assembled upon said shaft and operable in said larger bore, said cylinder having a first port through which air is adapted to enter at the outer end of the loose piston; also a second port through which air is adapted to enter at the outer end of the power piston and a third port through which air is adapted to be vented from an intermediate position to position the gear shifting shaft in neutral position, said second port being adapted for entry therethrough of air pressure at the outer end of the power piston, while both said first and third ports are vented to allow movement of said power piston in one direction to different gear ratio positions, said third port being adapted for entry of air pressure at the intermediate position, while said first port is admitting air pressure and said second port is vented to allow movement of said power piston in the opposite direction to further gear ratio positions and a second loose piston slidably assembled on said gear shifting shaft and operable in said smaller bore and acting as a stop for the shifts in said opposite direction, said shifting cylinder having a fourth port for admission of air pressure at the outer end of said second loose piston for all shifts from "2nd" through "5th" ratios.

20. In shifter mechanism, in combination, a longitudinally shiftable gear shifting shaft having a notch therein, a gear shift lever having a notch therein, a rotatable shaft, a pair of arms rotatable with said shaft, a first plunger connected to one of said arms and engageable in the notch in said gear shifting shaft when said gear shifting shaft is in neutral position, a second plunger connected to the other arm and arranged to be withdrawn from the notch in the gear shift lever when said first plunger is engaged in the notch in the gear shifting shaft, said gear shifting shaft when moved from neutral position disengaging said first plunger from the notch in the gear shifting shaft, and a spring compressed by rotation of the arm connected to the second plunger upon movement of said gear shifting shaft from neutral position and acting to hold said second plunger against said gear shift lever for engagement in the notch in the gear shift lever when said lever is shifted to neutral position.

References Cited in the file of this patent

UNITED STATES PATENTS

| | | |
|---|---|---|
| 2,346,820 | Casler et al. | Apr. 18, 1944 |
| 2,911,848 | Carnagua | Nov. 10, 1959 |
| 2,931,237 | Backus | Apr. 5, 1960 |
| 2,933,944 | Carnagua | Apr. 26, 1960 |